(12) United States Patent
Williams

(10) Patent No.: US 9,796,029 B2
(45) Date of Patent: Oct. 24, 2017

(54) PIPE CUTTING TOOL

(76) Inventor: Dennis R. Williams, Zanesfield, OH (US)

( * ) Notice: Subject to any disclaimer, the term of this patent is extended or adjusted under 35 U.S.C. 154(b) by 2428 days.

(21) Appl. No.: 12/194,237

(22) Filed: Aug. 19, 2008

(65) Prior Publication Data

US 2009/0049697 A1    Feb. 26, 2009

Related U.S. Application Data

(60) Provisional application No. 60/956,759, filed on Aug. 20, 2007.

(51) Int. Cl.
*B26D 3/08* (2006.01)
*B23D 21/08* (2006.01)

(52) U.S. Cl.
CPC .............. *B23D 21/08* (2013.01); *Y10T 83/04* (2015.04)

(58) Field of Classification Search
CPC ............................... Y10T 83/04; B23D 21/08
USPC ....... 30/101, 102, 92–94, 90.1–90.7, 95, 96, 30/107, 105; 83/684, 669, 54; 82/99.1
See application file for complete search history.

(56) References Cited

U.S. PATENT DOCUMENTS

| | | | |
|---|---|---|---|
| 2,195,568 A * | 4/1940 | Hexdall | ........................ 408/28 |
| RE29,803 E | 10/1978 | Breese | |
| 4,831,732 A | 5/1989 | Garton | |
| 5,315,759 A | 5/1994 | Mashata | |
| 5,647,803 A * | 7/1997 | Killer | ............................ 470/67 |
| 5,809,652 A * | 9/1998 | Ducret | ............................ 30/90.7 |
| 6,393,700 B1 * | 5/2002 | Babb | ............................. 30/102 |
| 6,637,115 B2 * | 10/2003 | Walsh et al. | ...................... 30/94 |
| 2009/0013535 A1 * | 1/2009 | Derancourt | ................... 30/90.6 |

OTHER PUBLICATIONS

WIPO, PCT International Search Report, dated Nov. 3, 2008, International Application No. PCT/US08/73587.
WIPO, PCT Written Opinion, dated Nov. 3, 2008, International Application No. PCT/US08/73587.

* cited by examiner

*Primary Examiner* — Omar Flores Sanchez
(74) *Attorney, Agent, or Firm* — Frost Brown Todd LLC

(57) ABSTRACT

A pipe-cutting tool is provided. This tool includes a body; a track on the middle portion of the body; a first moveable carriage mounted on the track, wherein the first carriage includes first and second rollers mounted therein; a handle mounted in the rear portion of the body, wherein the handle is connected to the first moveable carriage; a second moveable carriage slidably mounted on the track, wherein the second moveable carriage further includes a rotatable cutting blade mounted therein; a carriage stop mounted on or formed integrally with on the front portion of the body, wherein the carriage stop is adapted to receive therein a portion of the second moveable carriage; and a biasing member mounted between the carriage stop and the second moveable carriage, wherein the biasing member exerts substantially continuous force on the second moveable carriage for urging the rotatable cutting blade against a pipe being cut.

18 Claims, 3 Drawing Sheets

PIPE CUTTING TOOL

CROSS-REFERENCE TO RELATED APPLICATIONS

This patent application claims the benefit of U.S. Provisional Patent Application Ser. No. 60/956,759 filed on Aug. 20, 2007 and entitled "Pipe Cutter," the disclosure of which is incorporated by reference as if fully rewritten herein.

BACKGROUND OF THE INVENTION

The present invention relates generally to tools used for cutting pipes, and more particularly to a "spring-loaded" pipe cutter that includes mechanical means for exerting substantially continuous force on certain portions of the pipe cutter for facilitating use thereof.

A pipe cutter is a common type of tool used by plumbers and other workers to cut pipe, tubing, conduit, and the like. Besides producing a generally clean cut, the pipe cutter is often a faster and more convenient way of cutting pipe than using a hacksaw. There are two basic types of pipe cutters. Plastic tubing cutters, which typically resemble a pair of pruning shears, may be used for thinner pipes and tubes such as a sprinkler pipe. Pipe cutters of the type having at least one sharp cutting wheel and adjustable jaw grips are typically used for cutting thicker pipes such as those made of copper or other metals. This second type of pipe cutter is used by inserting a length of pipe into the device and rotating the entire device circumferentially around the pipe, while repeatedly tightening the device against the pipe, until the pipe is cut all of the way through.

While pipe cutters such as the second type described above are generally effective for their intended purpose, these devices suffer from certain significant limitations. More specifically, currently available pipe cutters that are suitable for use with metal pipes require the user to continually tighten the device manually so that adequate force is applied to the portions of the device that actually cut the pipe. This force must be applied at the same time the user is rotating the entire device around the length of pipe or the cutting wheel will not cut through the metal. These design aspects make such pipe cutters unwieldy, difficult to use, and in some cases may result in damage to the area of the pipe that is being cut. Damage to an area of pipe is particularly problematic when only a short length of pipe is available for cutting and subsequently attaching an item (e.g., a compression connector) thereto. Therefore, there is a need for a manual pipe cutting tool that quickly and easily cuts metal pipe without causing damage.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a pipe-cutting system is provided. This pipe-cutting system includes a tool having body having a rear portion, a middle portion, and a front portion; a track attached to or formed integrally with the middle portion of the body; a first moveable carriage slidably mounted on the track, wherein the first moveable carriage further includes a first roller and a second roller mounted therein; a handle mounted in the rear portion of the body, wherein the handle is connected to the first moveable carriage, and wherein turning the handle in one direction causes the first moveable carriage to travel toward the rear portion of the body and turning the handle in the opposite direction causes the first moveable carriage to travel toward the front portion of the body; a second moveable carriage slidably mounted on the track, wherein the second moveable carriage further includes a rotatable cutting blade mounted therein, and wherein the rotatable cutting blade is adapted to cooperate with the first and second rollers to receive and cut a length of pipe; a carriage stop mounted on or formed integrally with on the front portion of the body, wherein the carriage stop is adapted to receive therein a portion of the second moveable carriage; and a biasing member mounted between the carriage stop and the second moveable carriage, wherein the biasing member exerts substantially continuous force on the second moveable carriage for urging the rotatable cutting blade against a pipe being cut.

In accordance with another aspect of the present invention, a pipe-cutting tool is provided. This pipe-cutting tool includes a rigid body having a rear portion, a middle portion, and a front portion; a track attached to or formed integrally with the middle portion of the body; a first moveable carriage slidably mounted on the track, wherein the first moveable carriage further includes a first housing, and wherein a first roller and a second roller are rotatably mounted in the first housing; a handle mounted in the rear portion of the body, wherein the handle is connected to the first moveable carriage, and wherein turning the handle in one direction causes the first moveable carriage to travel toward the rear portion of the body and turning the handle in the opposite direction causes the first moveable carriage to travel toward the front portion of the body; a second moveable carriage slidably mounted on the track, wherein the second moveable carriage further includes a second housing and wherein a rotatable cutting blade is mounted in the second housing, and wherein the rotatable cutting blade is adapted to cooperate with the first and second rollers to receive and cut a length of tubing or pipe; a carriage stop mounted on or formed integrally with on the front portion of the body, wherein the carriage stop is adapted to receive therein a portion of the housing of the second moveable carriage; and a biasing member mounted between the carriage stop and the second moveable carriage, wherein the biasing member exerts substantially continuous force on the second moveable carriage for urging the rotatable cutting blade against a pipe being cut.

In yet another aspect of this invention, a method for cutting a length of tubing or pipe is provided. This method includes providing a cutting tool such as those described above; inserting a length of tubing or pipe into the cutting tool between the first and second rollers and the rotatable cutting blade; turning the handle to tighten the first moveable carriage against the length of tubing or pipe; rotating the entire cutting tool around the length of tubing or pipe to engage the rotatable cutting blade; and continuing to rotate the cutting tool until the rotatable cutting blade has cut completely through the length of tubing or piping.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DESCRIPTION OF THE INVENTION

Figure 1:
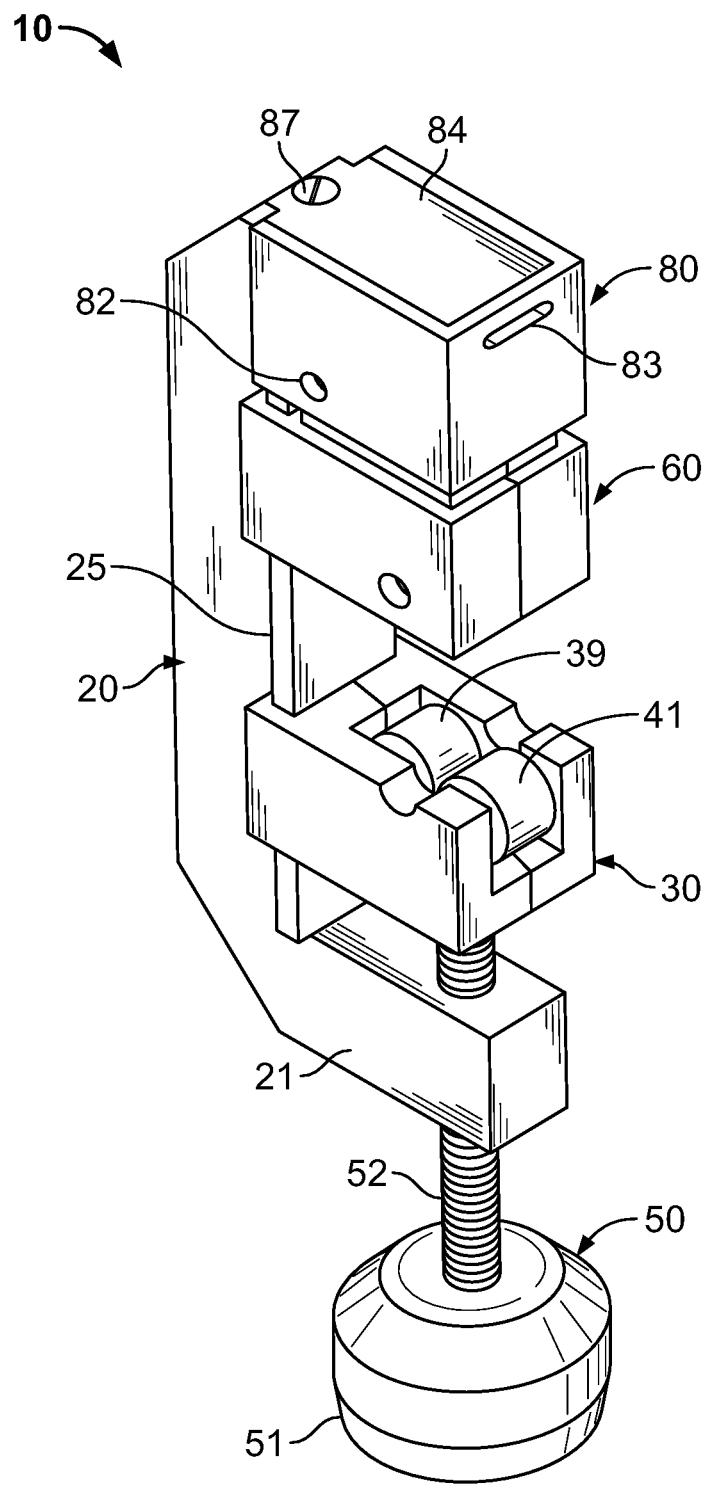
FIG. 1 is a front perspective view of a pipe cutting tool in accordance with an exemplary embodiment of the present invention.

Exemplary embodiments of the present invention are now described with reference to the Figures. Reference numerals are used throughout the description to refer to the various elements and structures. Although the following description contains many specifics for the purposes of illustration, a person of ordinary skill in the art will appreciate that many variations and alterations to the following details are also within the scope of the invention. Accordingly, the following embodiments of the invention are set forth without any loss of generality to, and without imposing limitations upon, the claimed invention.

The present invention relates to a device for use in cutting lengths of metal or plastic pipe or tubing. As previously indicated, a first general embodiment of this invention provides a pipe-cutting system; a second general embodiment of this invention provides a pipe cutting tool; and a third general embodiment of this invention provides a method for cutting a length of pipe or tubing. With reference now to the Figures, one or more specific embodiments of this invention shall be described in greater detail.

Figure 2:
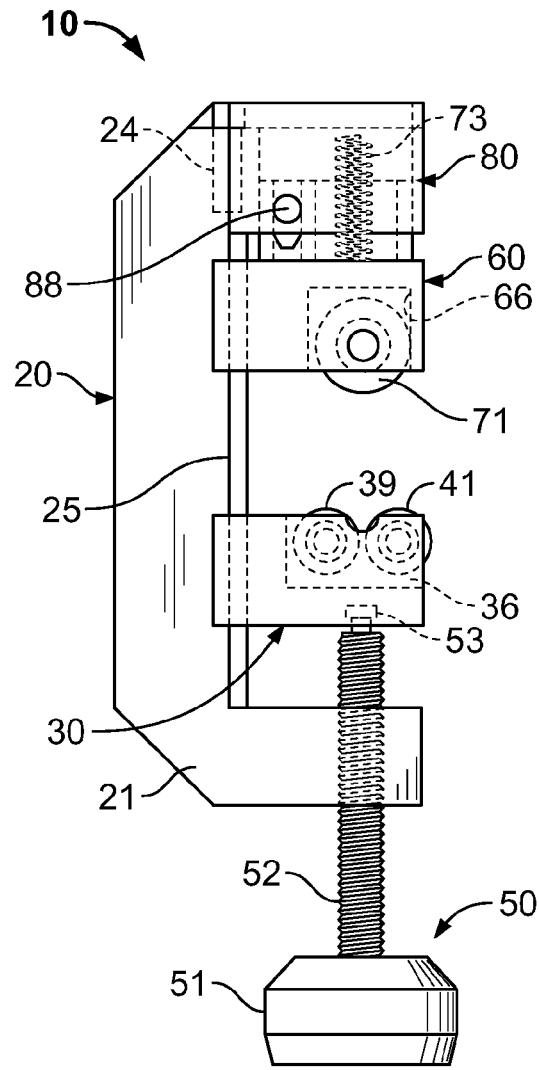
FIG. 2 is a side view of the pipe cutting tool of FIG. 1.
Figure 3:
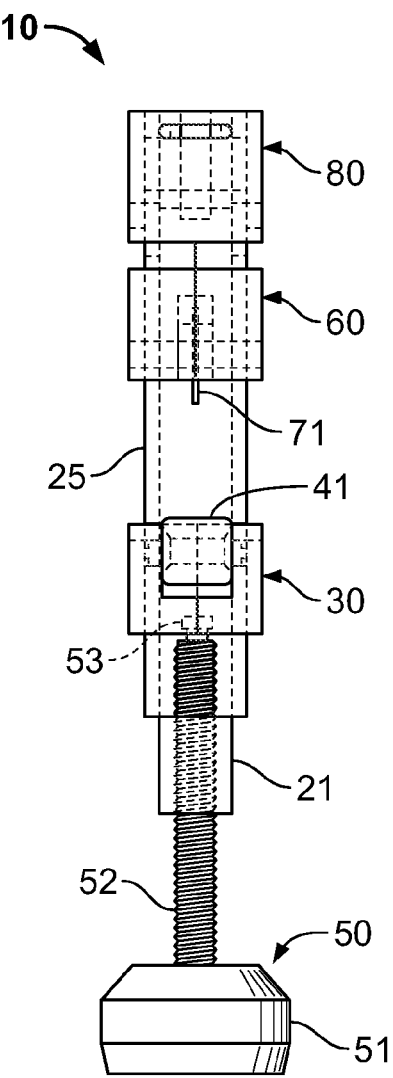
FIG. 3 is a front view of the pipe cutting tool of FIG. 1.
Figure 4:
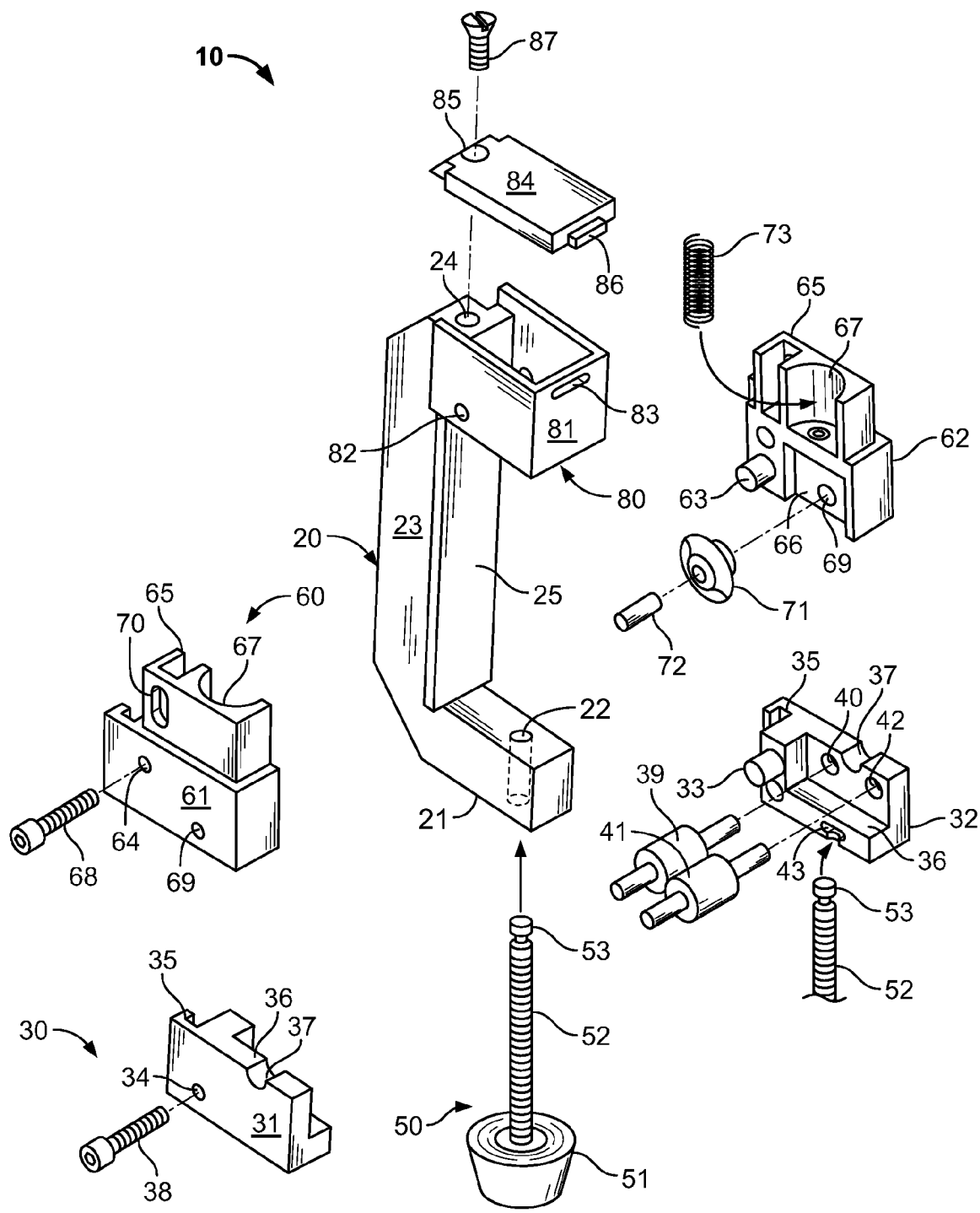
FIG. 4 is an exploded, front perspective view of the pipe cutting tool of FIG. 1.

The present invention provides a pipe cutting tool which comprises numerous components that are typically cast or machined from metal or other suitably rigid and durable materials. With reference to FIGS. 1-4, an exemplary embodiment of pipe cutting tool 10 according to the present invention includes a frame 20, a rear carriage 30 slidably mounted on frame 20, an adjustable handle 50 connected to rear carriage 30, a front carriage 60 also slidably mounted on frame 20 and a carriage stop 80, which is attached to the front portion of frame 20. As best shown in FIGS. 2 and 4, frame 20 is a roughly L-shaped structure that includes tail 21, threaded aperture 22, crossbar 23, aperture 24, and rail 25, which is mounted on or formed integrally with the underside of crossbar 23.

As best shown in FIG. 4, an exemplary embodiment of rear carriage 30 further includes first mating portion 31, a second mating portion 32, and peg 33 for providing structural stability to rear carriage 30 when the two mating portions are joined together. First mating portion 31 further includes aperture 34 and first portions of slot 35, chamber 36, C-shaped cutout 37, mounting aperture 40 (not shown), mounting aperture 42 (not shown), and notch 43 (not shown). Second mating portion 32 further includes second portions of slot 35, chamber 36, C-shaped cutout 37, mounting aperture 40, mounting aperture 42, and notch 43. When properly assembled, notch 35 engages rail 25 on frame 20 (to permit linear motion of the carriage on the rail), rollers 39 and 41 are inserted into mounting apertures 40 and 42 respectively within chamber 36, and contoured tip 53 is inserted into notch 43. Hex bolt 38 is inserted into aperture 34 to secure the two mating portions to one another. As will be appreciated by the skilled artisan, the two mating portions may be welded together or joined by any other acceptable means. In this embodiment, rear carriage 30 may be opened for purposes of replacing rollers 39 and 41, if necessary or desired.

Adjustable handle 50 includes knob 51, connector 52 and contoured tip 53, which as previous discussed, is inserted into notch 43 when rear carriage 30 is properly assembled. Connector 22 is inserted through threaded aperture 22 in tail 21 and by turning knob 51 in one direction or another, the user of cutting tool 10 may move rear carriage 30 either toward tail 21 or toward carriage stop 80.

Again, as best shown in FIG. 4, an exemplary embodiment of front carriage 60 further includes first mating portion 61, second mating portion 62, and peg 63 for providing structural stability to front carriage 60 when the two mating portions are joined together. First mating portion 61 further includes aperture 64 and first portions of slot 65, first chamber 66 (not shown), second chamber 67, mounting aperture 69, and elongated aperture 70. Second mating portion 62 further includes second portions of slot 65, first chamber 66, second chamber 67, mounting aperture 69, and elongated aperture 70 (not shown). When properly assembled, notch 65 engages rail 25 on frame 20 (to permit linear motion of the carriage on the rail), pin 72, which passes through the center of cutting blade 71, is inserted into aperture 69 within first chamber 66, a biasing member or spring 73 is positioned within second chamber 67. Hex bolt 68 is inserted into aperture 64 to secure the two mating portions to one another. As will be appreciated by the skilled artisan, the two mating portions may be welded together or joined by any other acceptable means. In this embodiment, front carriage 60 may be opened for purposes of replacing cutting blade 71, if necessary or desired.

Carriage stop 80 is mounted on the front edge of frame 20 and includes housing 81, aperture 82, slot 83, and cap 84, which further includes aperture 85, and tab 86. Carriage stop 80 is secured to frame 20 by inserting press fit pin 88 (see FIG. 2) through aperture 82. Because a portion of front carriage 60 extends into and is received by housing 81, when properly assembled, press fit pin 88 also passes through elongated aperture 70, which provides an opening that is sufficiently large to permit linear movement of front carriage 60 along track 25 when cutting tool 10 is in use. Cap 84 mounted in housing 81 by inserting tab 86 into slot 83 and then inserting bolt 87 into aperture 24 to secure cap 84 to frame 20. When properly assembled, one end of spring 73 is positioned within front carriage 60 and the other end of spring 73 is positioned within carriage stop 80 (see FIG. 2). In this embodiment, cap 84 may be removed to access the interior of housing 81 and replace spring 73, if necessary or as desired.

To cut a length of metal tubing or pipe with pipe cutting tool 10, a user of the device turns knob 51 to open a sufficient distance between rear carriage 30 and front carriage 60. The pipe to be cut is then placed between the front and rear carriages and knob 51 is turned in the opposite direction to close the distance between the front and rear carriages. Knob 51 should be tightened to provide significant pressure from rear carriage 30 on the pipe being cut, but not enough pressure to deform the pipe. The user then rotates the entire tool around the pipe until cutting blade 71 has cut completely though the material thereof. Spring 73 places substantially continuous force on cutting blade 71 as the entire device is rotated around the pipe being cut; thus, the user need not continually tighten the knob or make other adjustments to keep sufficient force on the roller carrier and on the pipe. For this and other reasons, the present invention provides a superior cutting tool that consistently provides a clean cut when it is used on a length of pipe and that does not damage the pipe itself due to the fact that the user need not exert constant and/or excessive compressive force to cut the pipe.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A pipe-cutting tool, comprising:
   (a) a body having a rear portion, a middle portion, and a front portion;
   (b) a track attached to or formed integrally with the middle portion of the body;
   (c) a first moveable carriage, the position of which on the track is manually adjustable, slidably mounted on the track, wherein the first moveable carriage further includes a first roller and a second roller mounted therein;
   (d) a handle mounted in the rear portion of the body, wherein the handle is connected to the first moveable carriage, and wherein turning the handle in one direction causes the first moveable carriage to travel toward the rear portion of the body and turning the handle in the opposite direction causes the first moveable carriage to travel toward the front portion of the body;
   (e) a second moveable carriage, the position of which on the track is not manually adjustable, slidably mounted on the track, wherein the second moveable carriage further includes a rotatable cutting blade mounted therein, and wherein the rotatable cutting blade is adapted to cooperate with the first and second rollers to receive and cut a length of pipe;
   (f) a carriage stop mounted on or formed integrally with the front portion of the body, wherein the carriage stop is adapted to receive therein a portion of the second moveable carriage; and
   (g) a biasing member mounted between the carriage stop and the second moveable carriage, wherein the biasing member exerts substantially continuous force on the second moveable carriage for continuously urging the rotatable cutting blade against a pipe being cut until the cutting process is complete.

2. The pipe cutting tool of claim 1, wherein the first moveable carriage further comprises a housing, and wherein the first and second rollers are mounted within the housing.

3. The pipe cutting tool of claim 2, wherein the housing further includes a first portion and a second portion, and wherein the first and second portions are detachable from one another for accessing the interior of the first moveable carriage and replacing the rollers.

4. The pipe cutting tool of claim 1, wherein the handle further includes: a gripping device; and a threaded connector attached to the gripping device at one end thereof and to the first moveable carriage at the other end thereof, and wherein the threaded connector passes through the read portion of the body of the pipe cutting tool.

5. The pipe cutting tool of claim 1, wherein the second moveable carriage further comprises a housing, and wherein the rotatable cutting blade is mounted within the housing.

6. The pipe cutting tool of claim 5, wherein the housing further includes a first portion and a second portion, and wherein the first and second portions are detachable from one another for accessing the interior of the second movable carriage and replacing the rotatable cutting blade.

7. The pipe cutting tool of claim 1, wherein the carriage stop further comprises a removable cap for accessing the interior of the carriage stop and replacing the biasing member.

8. A pipe-cutting tool, comprising:
   (a) a rigid body having a rear portion, a middle portion, and a front portion;
   (b) a track attached to or formed integrally with the middle portion of the body;
   (c) a first moveable carriage, the position of which on the track is manually adjustable, slidably mounted on the track, wherein the first moveable carriage further includes a first housing, and wherein a first roller and a second roller are rotatably mounted in the first housing;
   (d) a handle mounted in the rear portion of the body, wherein the handle is connected to the first moveable carriage, and wherein turning the handle in one direction causes the first moveable carriage to travel toward the rear portion of the body and turning the handle in the opposite direction causes the first moveable carriage to travel toward the front portion of the body;
   (e) a second moveable carriage, the position of which on the track is not manually adjustable, slidably mounted on the track, wherein the second moveable carriage further includes a second housing and wherein a rotatable cutting blade is mounted in the second housing, and wherein the rotatable cutting blade is adapted to cooperate with the first and second rollers to receive and cut a length of tubing or pipe;
   (f) a carriage stop mounted on or formed integrally with the front portion of the body, wherein the carriage stop is adapted to receive therein a portion of the housing of the second moveable carriage; and
   (g) a biasing member mounted between the carriage stop and the second moveable carriage, wherein the biasing member exerts substantially continuous force on the second moveable carriage for continuously urging the rotatable cutting blade against a pipe being cut until the cutting process is complete.

9. The pipe cutting tool of claim 8, wherein the first housing further includes a first portion and a second portion, and wherein the first and second portions are detachable from one another for accessing the interior of the first moveable carriage and replacing the rollers.

10. The pipe cutting tool of claim 8, wherein the handle further includes: a gripping device; and a threaded connector attached to the gripping device at one end thereof and to the first moveable carriage at the other end thereof, and wherein the threaded connector passes through the read portion of the body of the pipe cutting tool.

11. The pipe cutting tool of claim 8, wherein the second housing further includes a first portion and a second portion, and wherein the first and second portions are detachable from one another for accessing the interior of the second movable carriage and replacing the rotatable cutting blade.

12. The pipe cutting tool of claim 8, wherein the carriage stop further comprises a removable cap for accessing the interior of the carriage stop and replacing the biasing member.

13. The pipe cutting tool of claim 8, wherein the pipe cutting tool further includes cast components, machined components, or a combination thereof.

14. A method for cutting a length of tubing or pipe, comprising:
  (a) providing a cutting tool, wherein the cutting tool further includes:
    (i) a body having a rear portion, a middle portion, and a front portion;
    (ii) a track attached to or formed integrally with the middle portion of the body;
    (iii) a first moveable carriage, the position of which on the track is manually adjustable, slidably mounted on the track, wherein the first moveable carriage further includes a housing, and wherein a first roller and a second roller are rotatably mounted in the housing;
    (iv) a handle mounted in the rear portion of the body, wherein the handle is connected to the first moveable carriage, and wherein turning the handle in one direction causes the first moveable carriage to travel toward the rear portion of the body and turning the handle in the opposite direction causes the first moveable carriage to travel toward the front portion of the body;
    (v) a second moveable carriage, the position of which on the track is not manually adjustable, slidably mounted on the track, wherein the second moveable carriage further includes a housing and wherein a rotatable cutting blade is mounted in the housing, and wherein the rotatable cutting blade is adapted to cooperate with the first and second rollers to receive and cut a length of tubing or pipe;
    (vi) a carriage stop mounted on or formed integrally with en the front portion of the body, wherein the carriage stop is adapted to receive therein a portion of the housing of the second moveable carriage; and
    (vii) a biasing member mounted between the carriage stop and the second moveable carriage, wherein the biasing member exerts substantially continuous force on the second moveable carriage; and
  (b) inserting a length of tubing or pipe into the cutting tool between the first and second rollers and the rotatable cutting blade;
  (c) turning the handle to tighten the first moveable carriage against the length of tubing or pipe;
  (d) rotating the entire cutting tool around the length of tubing or pipe to engage the rotatable cutting blade; and
  (e) continuing to rotate the cutting tool until the rotatable cutting blade has cut completely through the length of tubing or piping.

15. The method of claim 14, wherein the first housing further includes a first portion and a second portion, and wherein the first and second portions are detachable from one another for accessing the interior of the first moveable carriage and replacing the rollers.

16. The method of claim 14, wherein the handle further includes: a gripping device; and a threaded connector attached to the gripping device at one end thereof and to the first moveable carriage at the other end thereof, and wherein the threaded connector passes through the read portion of the body of the pipe cutting tool.

17. The method of claim 14, wherein the second housing further includes a first portion and a second portion, and wherein the first and second portions are detachable from one another for accessing the interior of the second movable carriage and replacing the rotatable cutting blade.

18. The method of claim 14, wherein the carriage stop further comprises a removable cap for accessing the interior of the carriage stop and replacing the biasing member.

\* \* \* \* \*